United States Patent
Takeuchi (10) Patent No.: US 11,639,098 B2
(45) Date of Patent: May 2, 2023

(54) STRADDLE VEHICLE

(71) Applicant: KAWASAKI MOTORS, LTD., Akashi (JP)

(72) Inventor: Hiroshi Takeuchi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 127 days.

(21) Appl. No.: 17/367,880

(22) Filed: Jul. 6, 2021

(65) Prior Publication Data

US 2022/0009341 A1 Jan. 13, 2022

(30) Foreign Application Priority Data

Jul. 7, 2020 (JP) .............................. JP2020-116929

(51) Int. Cl.
| | | |
|---|---|---|
| B60K 11/06 | (2006.01) | |
| B60K 6/40 | (2007.10) | |
| B60K 11/08 | (2006.01) | |
| B62M 7/02 | (2006.01) | |

(52) U.S. Cl.
CPC ................. B60K 11/06 (2013.01); B60K 6/40 (2013.01); B60K 11/08 (2013.01); B62M 7/02 (2013.01); *B60Y 2200/12* (2013.01); *B60Y 2200/92* (2013.01); *B60Y 2300/00* (2013.01)

(58) Field of Classification Search
CPC .......... B60K 11/06; B60K 6/40; B60K 11/08; B62M 7/02; B60Y 2200/12; B60Y 2200/92; B60Y 2300/00
See application file for complete search history.

(56) References Cited

U.S. PATENT DOCUMENTS

| | | | | |
|---|---|---|---|---|
| 2012/0111651 | A1* | 5/2012 | Irie | B62K 11/04 180/65.1 |
| 2013/0075178 | A1* | 3/2013 | Petersson | B62J 17/04 180/220 |
| 2013/0264134 | A1 | 10/2013 | Matsuda | |
| 2014/0345827 | A1 | 11/2014 | Matsuda | |
| 2015/0008053 | A1* | 1/2015 | Matsuda | B62K 11/04 180/65.1 |

FOREIGN PATENT DOCUMENTS

| | | |
|---|---|---|
| EP | 2657114 A1 | 10/2013 |
| EP | 3147189 A1 | 3/2017 |
| JP | 2015077887 A | 4/2015 |

* cited by examiner

*Primary Examiner* — Jacob M Amick
(74) *Attorney, Agent, or Firm* — Alleman Hall Creasman & Tuttle LLP (57) ABSTRACT

A straddle vehicle includes: an on-vehicle part disposed behind an engine and including a battery; and a traveling wind passage structure disposed at a lateral side of the on-vehicle part. The battery includes a heat radiator exposed a side surface of the battery. The traveling wind passage structure includes: an inflow port into which traveling wind flows; a outflow port from which the traveling wind flows; and a side wall that is located between the inflow port and the outflow port and defines a passage between the side wall and a side surface of the on-vehicle part. The passage includes: a heat exchange region adjacently located at a lateral side of the heat radiator; and an upstream region adjacently located upstream of the heat exchange region. A passage sectional area of the heat exchange region is smaller than a passage sectional area of the upstream region.

9 Claims, 6 Drawing Sheets

STRADDLE VEHICLE

CROSS-REFERENCE TO RELATED APPLICATION

This application claims priority to and the benefit of Japanese Patent Application No. 2020-116929, filed on Jul. 7, 2020, the entire disclosure of which is incorporated herein by reference.

BACKGROUND OF THE INVENTION

Technical Field

The present disclosure relates to a hybrid straddle vehicle including an engine and an electric motor both of which make the hybrid straddle vehicle travel.

Description of the Related Art

Japanese Laid-Open Patent Application Publication No. 2015-77887 discloses a motorcycle that is a hybrid vehicle on which a battery is mounted. The battery stores electric power to be supplied to an electric motor which makes the hybrid vehicle travel.

While the hybrid vehicle is traveling, the electric motor is made to generate high torque in some cases. In this case, the amount of heat generated by the battery becomes large. Since the battery is arranged behind an engine and under a seat on which a rider is seated, the battery is hardly cooled due to such layout. However, since an in-vehicle space of a straddle vehicle, such as a motorcycle, is significantly limited, it is difficult to additionally provide a cooling device for the battery.

SUMMARY OF THE INVENTION

A straddle vehicle according to one aspect of the present disclosure includes: an engine that generates traveling power to be transmitted to a driving wheel; an electric motor that generates traveling power to be transmitted to the driving wheel; an on-vehicle part disposed behind the engine and including a battery that stores electric power to be supplied to the electric motor; and a traveling wind passage structure disposed at a lateral side of the on-vehicle part. The battery includes at least one heat radiator exposed on at least one of side surfaces of the battery. The traveling wind passage structure includes at least one inflow port into which traveling wind flows, at least one outflow port from which the traveling wind flows, and at least one side wall that is located between the inflow port and the outflow port and defines a passage between the at least one side wall and a side surface of the on-vehicle part. The passage includes a heat exchange region adjacently located at a lateral side of the heat radiator and an upstream region adjacently located upstream of the heat exchange region. A passage sectional area of the heat exchange region is smaller than a passage sectional area of the upstream region.

According to the above configuration, when the traveling wind having flowed through the inflow port into the passage defined by the traveling wind passage structure flows through the upstream region and enters into the heat exchange region, the flow velocity of the traveling wind increases. Therefore, the heat exchange between the traveling wind and the heat radiator of the battery is promoted, and the battery is effectively cooled. Moreover, since the passage sectional area of the heat exchange region is small, an occupied space of the traveling wind passage structure in the vicinity of the battery can be suppressed. Therefore, the traveling wind passage structure is made compact, and the straddle vehicle is prevented from increasing in size.

DESCRIPTION OF THE PREFERRED EMBODIMENTS

Hereinafter, an embodiment will be described with reference to the drawings.

Figure 1:
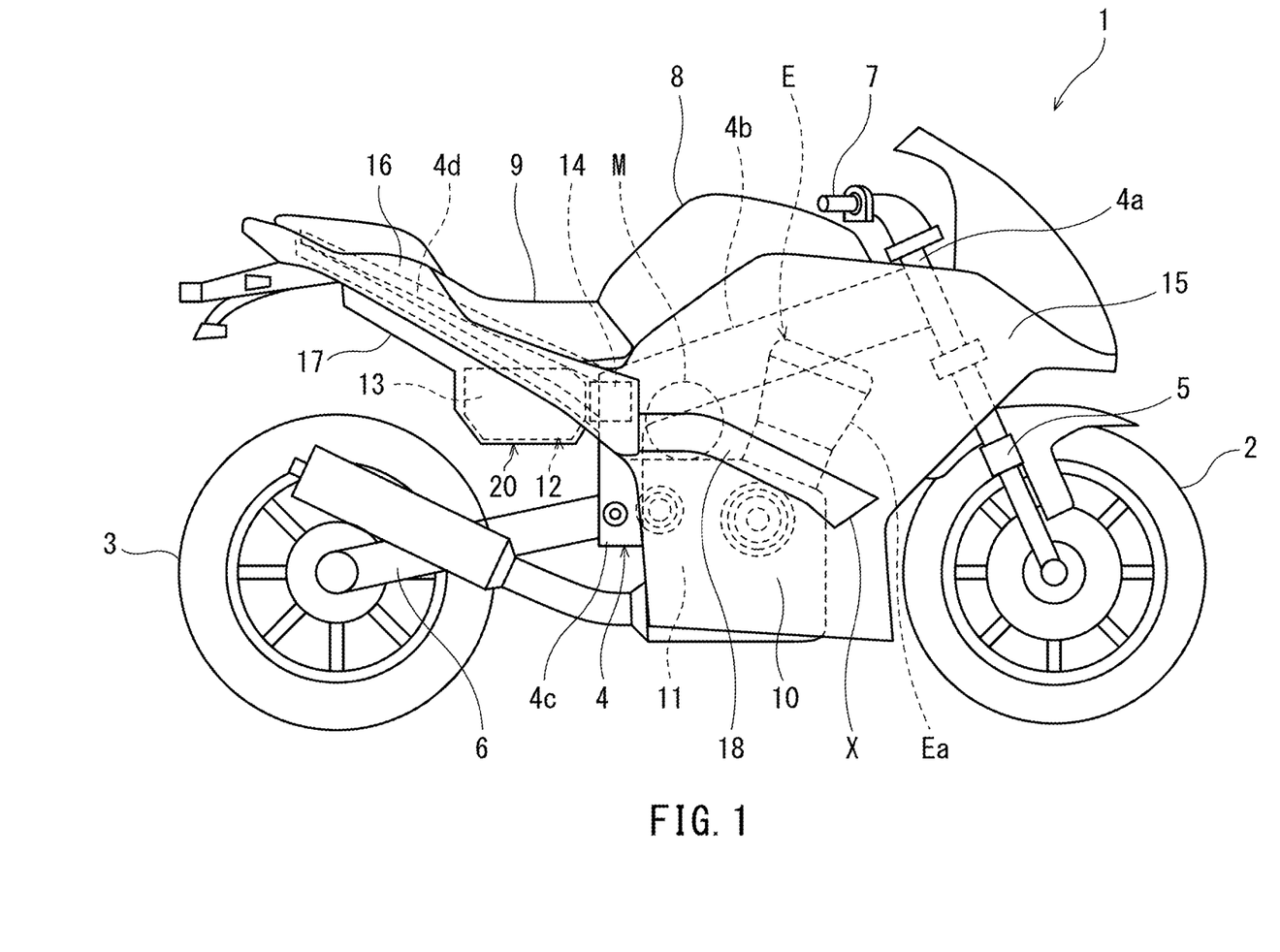
FIG. 1 is a right side view showing a motorcycle according to an embodiment.

FIG. 1 is a right side view showing a motorcycle 1 according to the embodiment. As shown in FIG. 1, the motorcycle 1 is one example of a straddle vehicle straddled by a rider, and is a hybrid vehicle. The motorcycle 1 includes a front wheel 2 (driven wheel), a rear wheel 3 (driving wheel), a vehicle body frame 4, a front suspension 5 which connects the front wheel 2 to a front portion of the vehicle body frame 4, and a rear suspension which connects the rear wheel 3 to a rear portion of the vehicle body frame 4.

The vehicle body frame 4 includes a head pipe 4a, a main frame 4b, a pivot frame 4c, and a seat support frame 4d. A steering shaft is inserted into the head pipe 4a so as to be rotatable. The main frame 4b extends rearward from the head pipe 4a. The pivot frame 4c extends downward from a rear end portion of the main frame 4b. A front end portion of a swing arm 6 that rotatably supports the rear wheel 3 is rotatably connected to the pivot frame 4c. The seat support frame 4d extends from the rear end portion of the main frame 4b to an obliquely upper and rear side.

A bar handle 7 gripped by the rider with his/her hands is disposed at the steering shaft inserted into the head pipe 4a. A fuel tank 8 is disposed behind the handle 7. A seat 9 on which the rider is seated is disposed behind the fuel tank 8. The seat 9 is supported by the seat support frame 4d. An engine E as a travel power source is mounted on the main frame 4b so as to be located between the front wheel 2 and the rear wheel 3. The engine E generates traveling power to be transmitted to the rear wheel 3.

A crank case 10 extends rearward from a lower portion of a cylinder Ea of the engine E. An electric motor M as a travel power source is disposed behind the cylinder Ea of the engine E and above the crank case 10. The electric motor M generates traveling power to be transmitted to the rear wheel 3. A transmission 11 is arranged inside the crank case 10. The transmission 11 changes the speed of the power output from the engine E and/or the electric motor M. The power output from the transmission 11 is transmitted to the rear wheel 3 through an output transmitting structure (such as a chain or a belt).

An on-vehicle part 12 is disposed under the seat 9 and behind the cylinder Ea of the engine E. The on-vehicle part 12 may include parts which are adjacent to each other and lined up in a front-rear direction. The on-vehicle part 12 may include at least a drive-system battery 13 that stores electric power to be supplied to the electric motor M. The on-vehicle part 12 may include, for example, the battery 13 and a part 14 adjacently located in front of the battery 13. The part 14 may be, for example, a storage case or an electric part (such as a relay box, a fuse box, or a regulator). The on-vehicle part 12 may include, for example, the battery 13 and the electric motor M disposed between the battery 13 and the cylinder Ea in the front-rear direction. A lower end of the battery 13 is located lower than and in front of an upper end of the rear wheel 3. Part of the battery 13 is located under the seat support frame 4d.

A side cowl 15 is disposed at a lateral side of the main frame 4b and the engine E. A rear cowl 16 is disposed at a lateral side of the seat support frame 4d. A rear fender 17 is disposed under the seat support frame 4d. An air guide 18 is disposed at a lateral side of the electric motor M and the engine E. An inflow port X into which traveling wind flows is located at a front end of the air guide 18.

As one example, the inflow port X may be open forward and be located outside the engine E in a vehicle width direction. The inflow port X may be located in front of the engine E. The air guide 18 guides the traveling wind, having flowed into the inflow port X, to the rear fender 17, and the battery 13 is cooled by the traveling wind. To be specific, in the present embodiment, the rear fender 17 and the air guide 18 constitute a traveling wind passage structure 20. In this case, the inflow port X of the air guide 18 is an inflow port of the traveling wind passage structure 20.

Figure 2:
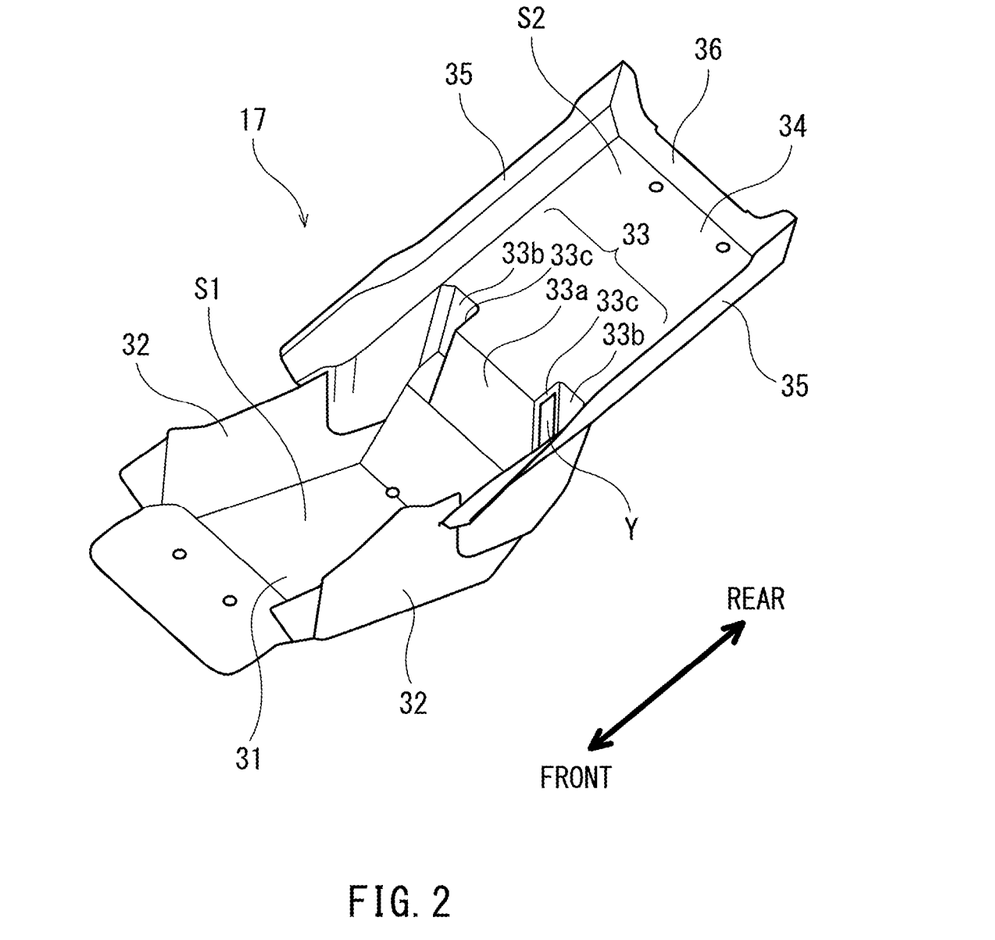
FIG. 2 is a perspective view showing a rear fender of FIG. 1 when viewed from a front-left and upper side.

FIG. 2 is a perspective view showing the rear fender 17 of FIG. 1 when viewed from a front-left and upper side. As shown in FIG. 2, the rear fender 17 extends in the front-rear direction and has a section that is orthogonal to the front-rear direction, has a substantially recessed shape, and is open upward. The rear fender 17 is made of resin by integral molding. The rear fender 17 includes: a first bottom wall 31; a pair of first side walls 32 projecting upward from both vehicle width direction ends of the first bottom wall 31; and a first rear wall 33 continuous with a rear end of the first bottom wall 31 and rear ends of the first side walls 32. The first bottom wall 31, the first side walls 32, and the first rear wall 33 define a housing space S1 in which the battery 13 (see FIG. 1) is housed. The housing space S1 is open forward. The first bottom wall 31 is opposed to the battery 13 from the lower side. Each first side wall 32 is opposed to the battery 13 from the lateral side. The first rear wall 33 is opposed to the battery 13 from the rear side.

The first rear wall 33 includes: a middle rear wall 33a; a pair of side rear walls 33b located at both sides of the middle rear wall 33a in the vehicle width direction and behind the middle rear wall 33a; and a pair of inner side walls 33c which connect the side rear walls 33b to the middle rear wall 33a. Each of the middle rear wall 33a and the side rear walls 33b includes a surface facing in the front-rear direction, and each of the inner side walls 33c includes a surface facing in the vehicle width direction. The first rear wall 33 has a shape that projects forward in a top view. The inner side walls 33c include respective openings that serve as a pair of outflow ports Y of the traveling wind passage structure 20.

The rear fender 17 further includes: a second bottom wall 34; a pair of second side walls 35 projecting upward from both vehicle width direction ends of the second bottom wall 34; and a second rear wall 36 continuous with a rear end of the second bottom wall 34 and rear ends of the second side walls 35. The seat support frame 4d (see FIG. 1) is disposed in a recessed space S2 defined by the second bottom wall 34, the second side walls 35, and the second rear wall 36. The second bottom wall 34 extends rearward from an upper end of the first rear wall 33. The second side walls 35 are continuous with the corresponding first side walls 32 and extend rearward from the corresponding first side walls 32.

Figure 3:
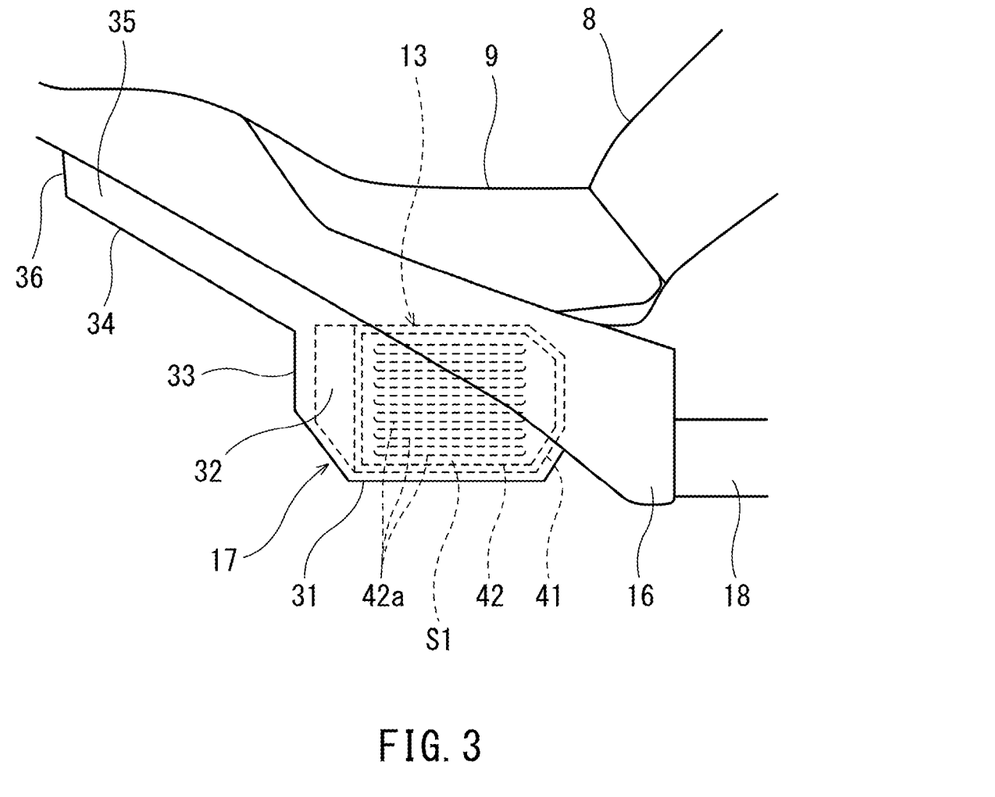
FIG. 3 is a partially enlarged view showing the motorcycle of FIG. 1.

FIG. 3 is a partially enlarged view showing the motorcycle 1 of FIG. 1. As shown in FIG. 3, the battery 13 is housed in the housing space S1 of the rear fender 17. The battery 13 is supported by the seat support frame 4d. A portion of the battery 13 which portion projects upward from the rear fender 17 is covered with the rear cowl 16 from an outside in the vehicle width direction. The battery 13 includes a battery cell group 40 (see FIG. 5) and a battery case 41 that houses the battery cell group 40.

The battery case 41 has a substantially box shape. The battery case 41 includes a pair of heat radiators 42. The heat radiators 42 are located at respective outer side surfaces of a pair of side walls of the battery case 41 and are exposed to an outside in the vehicle width direction. The heat radiators 42 are thermally connected to the battery cell group 40. Each of the heat radiators 42 has a substantially plate shape. Each of the heat radiators 42 include fins 42a extending in the front-rear direction and located on a side surface thereof opposed to the corresponding first side wall 32 of the rear fender 17.

Figure 4:
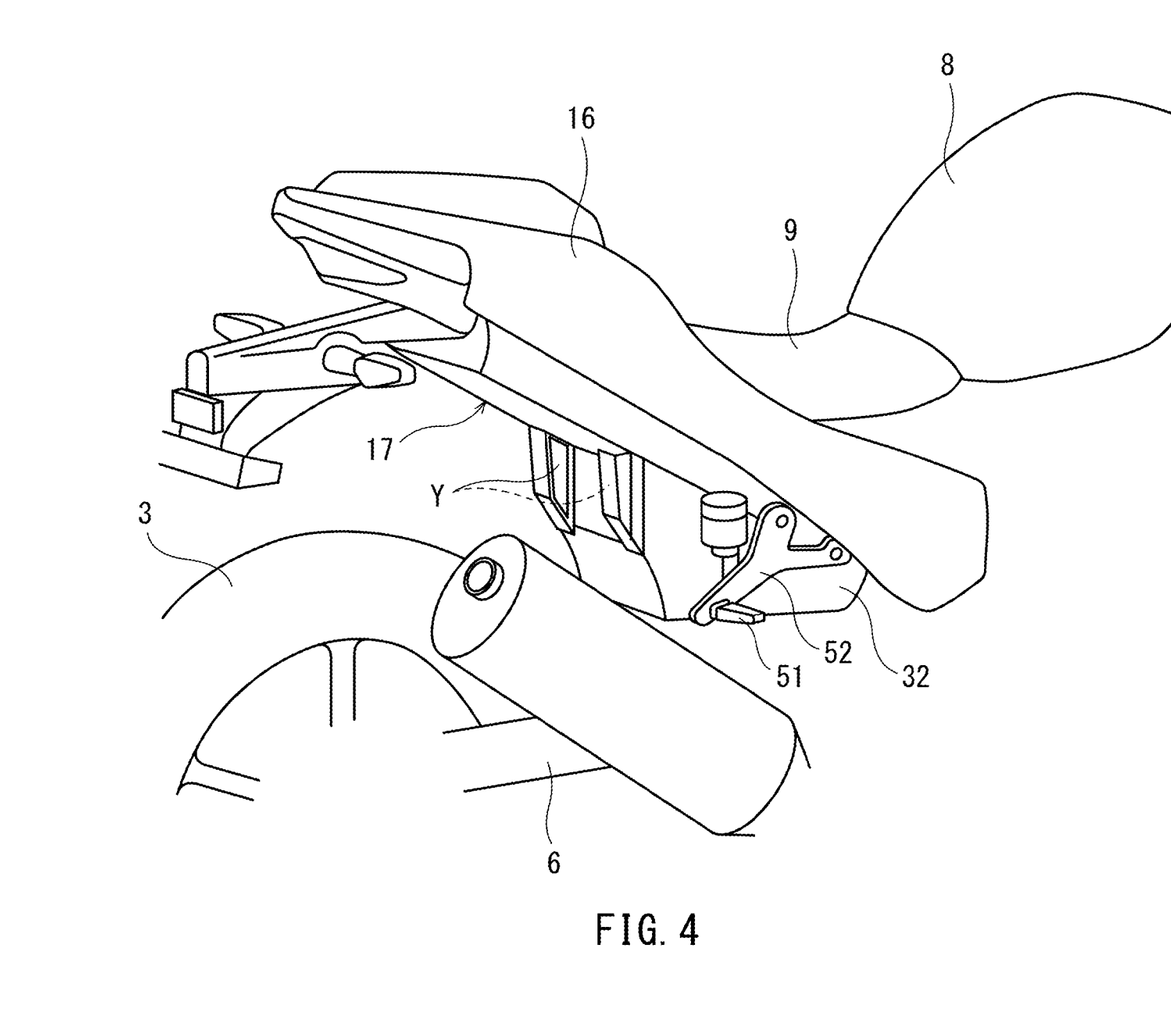
FIG. 4 is a perspective view showing the rear fender of the motorcycle of FIG. 1 and its vicinity when viewed from a rear-right side.

FIG. 4 is a perspective view showing the rear fender 17 of the motorcycle 1 of FIG. 1 and its vicinity when viewed from a rear-right side. As shown in FIG. 4, a step 21 on which a passenger places his/her foot and a step bracket 22 which supports the step 21 are disposed outside the first side wall 32 of the rear fender 17 in the vehicle width direction. The step bracket 22 is fixed to the seat support frame 4d (see FIG. 1). The outflow ports Y of the rear fender 17 are open inward in the vehicle width direction.

Figure 5:
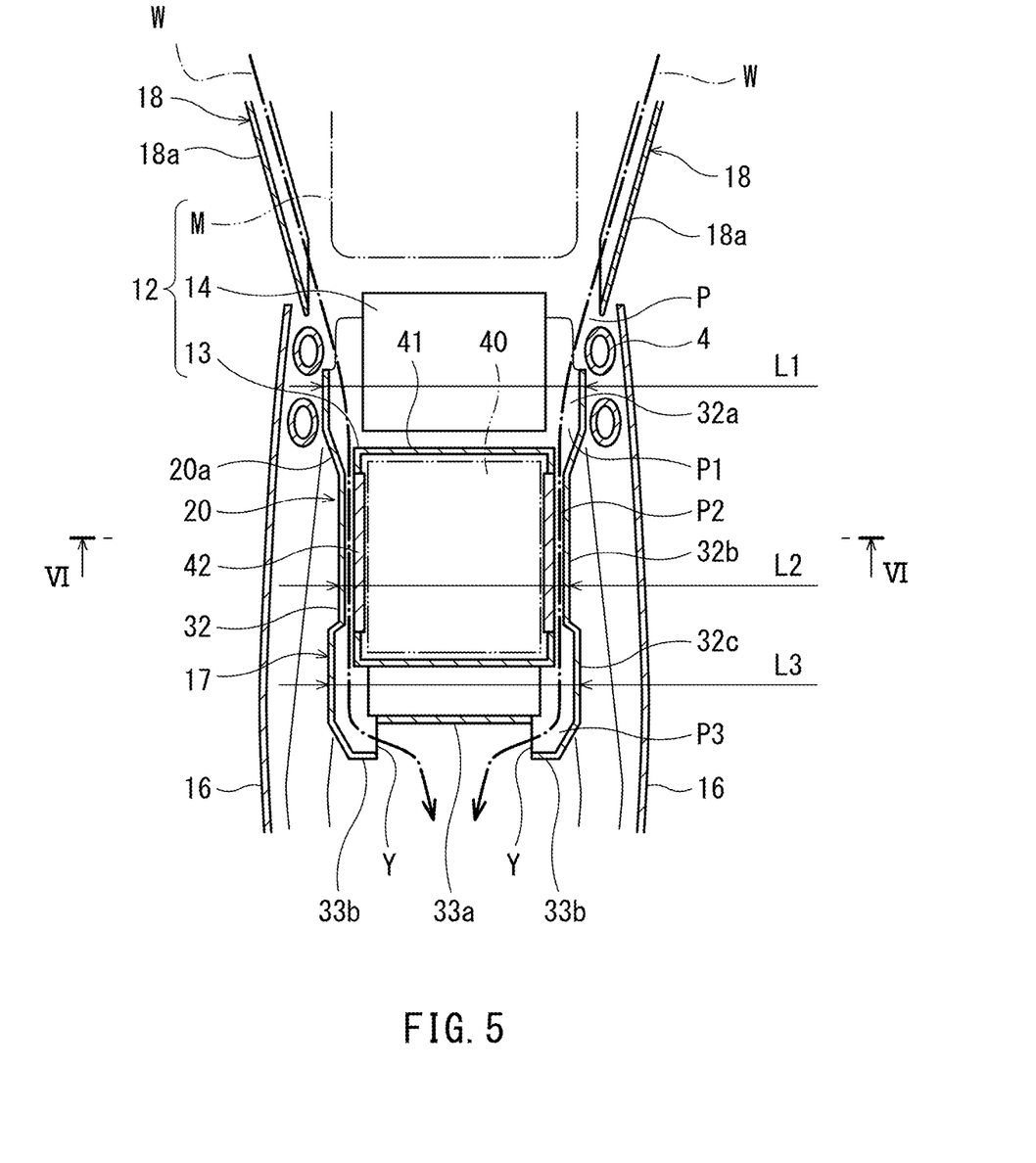
FIG. 5 is a horizontal sectional view showing a battery of FIG. 3 and its vicinity.

FIG. 5 is a horizontal sectional view showing the battery 13 of FIG. 3 and its vicinity. As shown in FIG. 5, a passage P is defined between a side surface of the on-vehicle part 12 and a side wall 20a of the traveling wind passage structure 20 disposed at a lateral side of the on-vehicle part 12. The passage P extends in the front-rear direction. The side wall 20a of the traveling wind passaged structure 20 includes a side wall 18a of the air guide 18 and the first side wall 32 of the rear fender 17.

A rear end portion of the side wall 18a of the air guide 18 may be connected to or overlap a front end portion of the corresponding first side wall 32 of the rear fender 17. In the present embodiment, the rear end portion of the side wall 18a of the air guide 18 and the front end portion of the corresponding first side wall 32 of the rear fender 17 are spaced apart from each other in the front-rear direction. A gap between the air guide 18 and the rear fender 17 is covered with the rear cowl 16 from the lateral side. Part of the vehicle body frame 4 may be disposed between the side wall 18a of the air guide 18 and the first side wall 32 of the rear fender 17.

The side wall 18a of the air guide 18 is inclined relative to the front-rear direction so as to extend inward in the vehicle width direction as the side wall 18a extends toward a rear end thereof. The side wall 18a of the air guide 18 is disposed such that traveling wind W guided to an inside surface of the side wall 18a flows toward an inside surface of the front end portion of the first side wall 32 of the rear fender 17. For example, the air guide 18 may be disposed such that when the side wall 18a of the air guide 18 is virtually extended rearward, the extended side wall 18a reaches a front end of the first side wall 32 of the rear fender 17.

Each of the first side walls 32 of the rear fender 17 includes a front portion 32a, a rear portion 32c, and an intermediate portion 32b between the front portion 32a and the rear portion 32c. The intermediate portion 32b is located inward relative to the front portion 32a and the rear portion 32c in the vehicle width direction and is opposed to the corresponding heat radiator 42 in the vehicle width direction. The passage P includes: an upstream region P1 defined by the front portion 32a of the first side wall 32; a heat exchange region P2 defined by the intermediate portion 32b of the first side wall 32; and a downstream region P3 defined by the rear portion 32c of the first side wall 32. The upstream region P1 is adjacently located upstream of the heat exchange region P2, and the downstream region P3 is adjacently located downstream of the heat exchange region P2. The heat exchange region P2 is adjacently located at a lateral side of the heat radiator 42.

A passage sectional area of the heat exchange region P2 is smaller than each of a passage sectional area of the upstream region P1 and a passage sectional area of the downstream region P3. Specifically, a dimension of the heat exchange region P2 in the vehicle width direction is smaller than each of a dimension of the upstream region P1 in the vehicle width direction and a dimension of the downstream region P3 in the vehicle width direction. A dimension L2 of an outer shape of the rear fender 17 in the heat exchange region P2 in the vehicle width direction is smaller than each of a dimension L1 of an outer shape of the rear fender 17 in the upstream region P1 in the vehicle width direction and a dimension L3 of an outer shape of the rear fender 17 in the downstream region P3 in the vehicle width direction.

When the traveling wind W which has been guided by the air guide 18 and flowed into the upstream region P1 flows through the heat exchange region P2, the flow velocity of the traveling wind W increases, and the traveling wind W is effectively subjected to heat exchange with the heat radiator 42. Then, when the traveling wind W flows out from the heat exchange region P2 and enters into the downstream region P3, the flow velocity of the traveling wind W decreases, and the traveling wind W flows inward in the vehicle width direction through the outflow port Y to an outside of the motorcycle 1.

Figure 6:
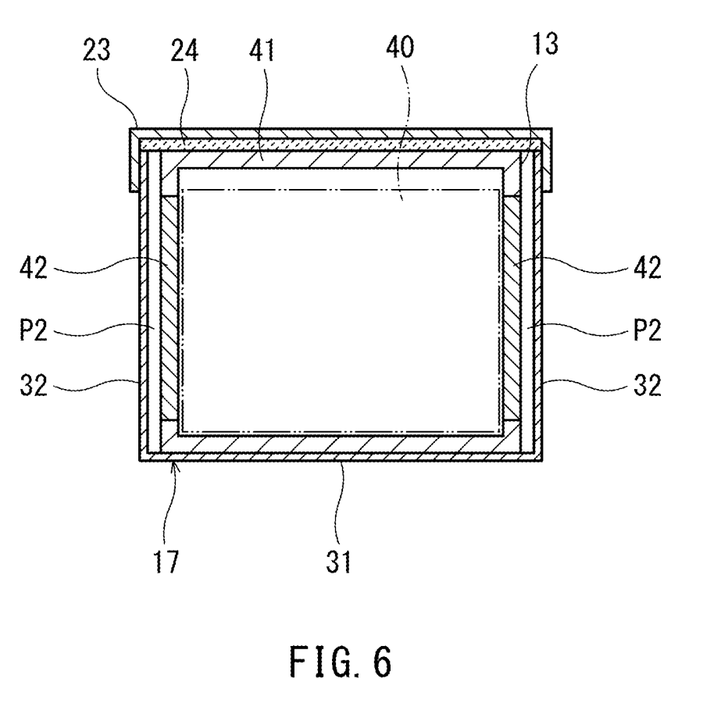
FIG. 6 is a sectional view taken along line IV-IV of FIG. 5.

FIG. 6 is a sectional view taken along line IV-IV of FIG. 5. As shown in FIG. 6, the first bottom wall 31 and the first side walls 32 of the rear fender 17 cover the battery 13 from the lower side and both sides in the vehicle width direction. A lower side of the heat exchange region P2 is closed. In the example shown in FIG. 6, the lower side of the heat exchange region P2 is closed by the first bottom wall 31. However, a seal (such as silicone, sponge, or rubber) may be filled in a lower end of the heat exchange region P2.

An upper side of the heat exchange region P2 is also closed. Specifically, the upper side of the heat exchange region P2 is closed by at least one of a lid 23 or a seal 24 (such as silicone, sponge, or rubber). The lid 23 closes an upper opening of the rear fender 17 at a position where the battery 13 is housed. The seal 24 is interposed between an upper surface of the battery 13 and a lower surface of the lid 23 and projects toward both sides in the vehicle width direction from the upper surface of the battery 13. With this, the seal 24 can also play a role of absorbing vibration of the battery 13. A seal (such as silicone, sponge, or rubber) may be filled in an upper end of the heat exchange region P2.

According to the above configuration, when the traveling wind W having flowed through the inflow port X into the passage P defined by the traveling wind passage structure 20 flows through the upstream region P1 and enters into the heat exchange region P2, the flow velocity of the traveling wind W increases. Therefore, the heat exchange between the traveling wind W and the heat radiator 42 of the battery 13 is promoted, and the battery 13 is effectively cooled. Moreover, since the passage sectional area of the heat exchange region P2 is small, an occupied space of the traveling wind passage structure 20 (rear fender 17) in the vicinity of the battery can be suppressed. Therefore, the traveling wind passage structure 20 (rear fender 17) is made compact, and the motorcycle 1 is prevented from increasing in size.

Moreover, the dimension L2 of the outer shape of the rear fender 17 in the heat exchange region P2 in the vehicle width direction is smaller than each of the dimension L1 of the outer shape of the rear fender 17 in the upstream region P1 in the vehicle width direction and the dimension L3 of the outer shape of the rear fender 17 in the downstream region P3 in the vehicle width direction. Therefore, the motorcycle 1 is prevented from increasing in width by the rear fender 17.

Moreover, since the passage sectional area of the heat exchange region P2 is smaller than the passage sectional area of the downstream region P3, the traveling wind W having cooled the heat radiator 42 of the battery 13 is smoothly discharged through the outflow port Y, and the flow rate of the traveling wind W flowing through the heat exchange region P2 is increased. Furthermore, since the heat radiators 42 include the fins 42a extending in the front-rear direction, the heat exchange between the traveling wind W and the fins 42a is promoted, and the cooling efficiency of the battery 13 improves.

Moreover, the inflow port X is open forward, and the outflow port Y is open inward in the vehicle width direction. Therefore, the traveling wind easily flows into the passage P defined by the traveling wind passage structure 20. In addition, the air discharged from the outflow port Y hardly hits the rider, and water hardly gets into the outflow port Y from an outside.

Moreover, the inflow port X is located outside the engine E in the vehicle width direction. Therefore, the traveling wind easily flows into the passage P of the traveling wind passage structure 20. Furthermore, the inflow port X is located in front of the engine E. Therefore, the traveling wind easily flows from the front side into the passage P of the traveling wind passage structure 20 without being blocked by anything.

Moreover, the upper and lower sides of the heat exchange region P2 are closed. Therefore, the traveling wind W flowing through the heat exchange region P2 is quickly discharged to the rear side. Furthermore, the rear fender 17 covers the battery 13 from both sides in the vehicle width direction and the lower side. Therefore, the left and right heat radiators 42 of the battery 13 are effectively cooled by the traveling wind guided by the single rear fender 17.

The present disclosure is not limited to the above embodiment. Modifications, additions, and eliminations may be made with respect to the configuration of the embodiment. For example, the air guide 18 may be omitted. In this case, a traveling wind intake port may be located at the side cowl 15, and the traveling wind having flowed through the traveling wind intake port to the inside of the side cowl 15 may be guided to the upstream region P1 defined by the front portions 32a of the first side walls 32 of the rear fender 17.

A component other than the rear fender 17 may be used as a component which defines a passage for air cooling together with the battery 13. The outflow ports Y may be directed in a direction (rearward, for example) other than inward in the vehicle width direction. The traveling wind passage structure 20 may be applied to a vehicle which does not include the side cowl 15. The motorcycle is described above as one example of the straddle vehicle. However, the present disclosure is applicable to a vehicle (three-wheeled vehicle, for example) other than the motorcycle as long as the vehicle is a vehicle straddled by a rider.

What is claimed is:

1. A straddle vehicle comprising:
an engine that generates traveling power to be transmitted to a driving wheel;
an electric motor that generates traveling power to be transmitted to the driving wheel;
an on-vehicle part disposed behind the engine and including a battery that stores electric power to be supplied to the electric motor; and
a traveling wind passage structure disposed at a lateral side of the on-vehicle part, wherein:
the battery includes at least one heat radiator exposed on at least one of side surfaces of the battery;
the traveling wind passage structure includes
at least one inflow port into which traveling wind flows,
at least one outflow port from which the traveling wind flows, and
at least one side wall that is located between the inflow port and the outflow port and defines a passage between the at least one side wall and a side surface of the on-vehicle part;
the passage includes
a heat exchange region adjacently located at a lateral side of the heat radiator and
an upstream region adjacently located upstream of the heat exchange region; and
a passage sectional area of the heat exchange region is smaller than a passage sectional area of the upstream region.

2. The straddle vehicle according to claim 1, wherein a dimension of an outer shape of the traveling wind passage structure in the heat exchange region in a vehicle width direction is smaller than a dimension of an outer shape of the traveling wind passage structure in the upstream region in the vehicle width direction.

3. The straddle vehicle according to claim 1, wherein:
the passage includes a downstream region adjacently located downstream of the heat exchange region; and
the passage sectional area of the heat exchange region is smaller than a passage sectional area of the downstream region.

4. The straddle vehicle according to claim 1, wherein:
the passage extends in a front-rear direction; and
the heat radiator includes fins extending in the front-rear direction.

5. The straddle vehicle according to claim 1, wherein:
the inflow port is open forward; and
the outflow port is open inward in a vehicle width direction.

6. The straddle vehicle according to claim 1, wherein the inflow port is located outside the engine in a vehicle width direction.

7. The straddle vehicle according to claim 1, wherein the inflow port is located in front of the engine.

8. The straddle vehicle according to claim 1, wherein upper and lower sides of the heat exchange region are closed.

9. The straddle vehicle according to claim 1, wherein:
the at least one heat radiator comprises a pair of heat radiators disposed at both respective side surfaces of the battery in a vehicle width direction;
the at least one side wall comprises a pair of side walls; and
the traveling wind passage structure covers the battery from both sides in the vehicle width direction and a lower side.

* * * * *